Figure 7:
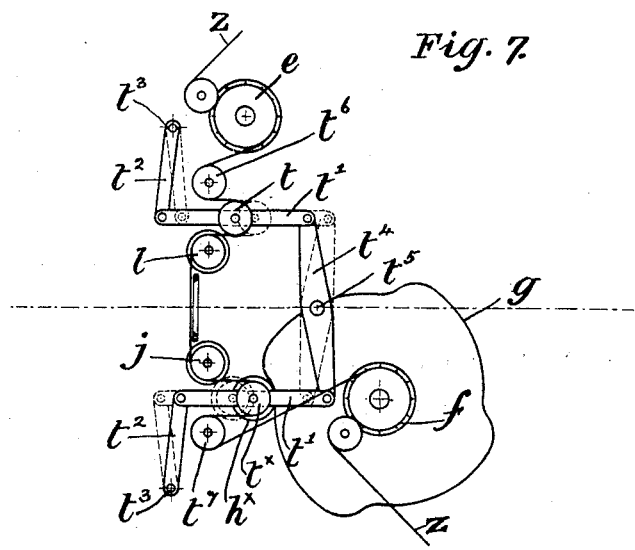

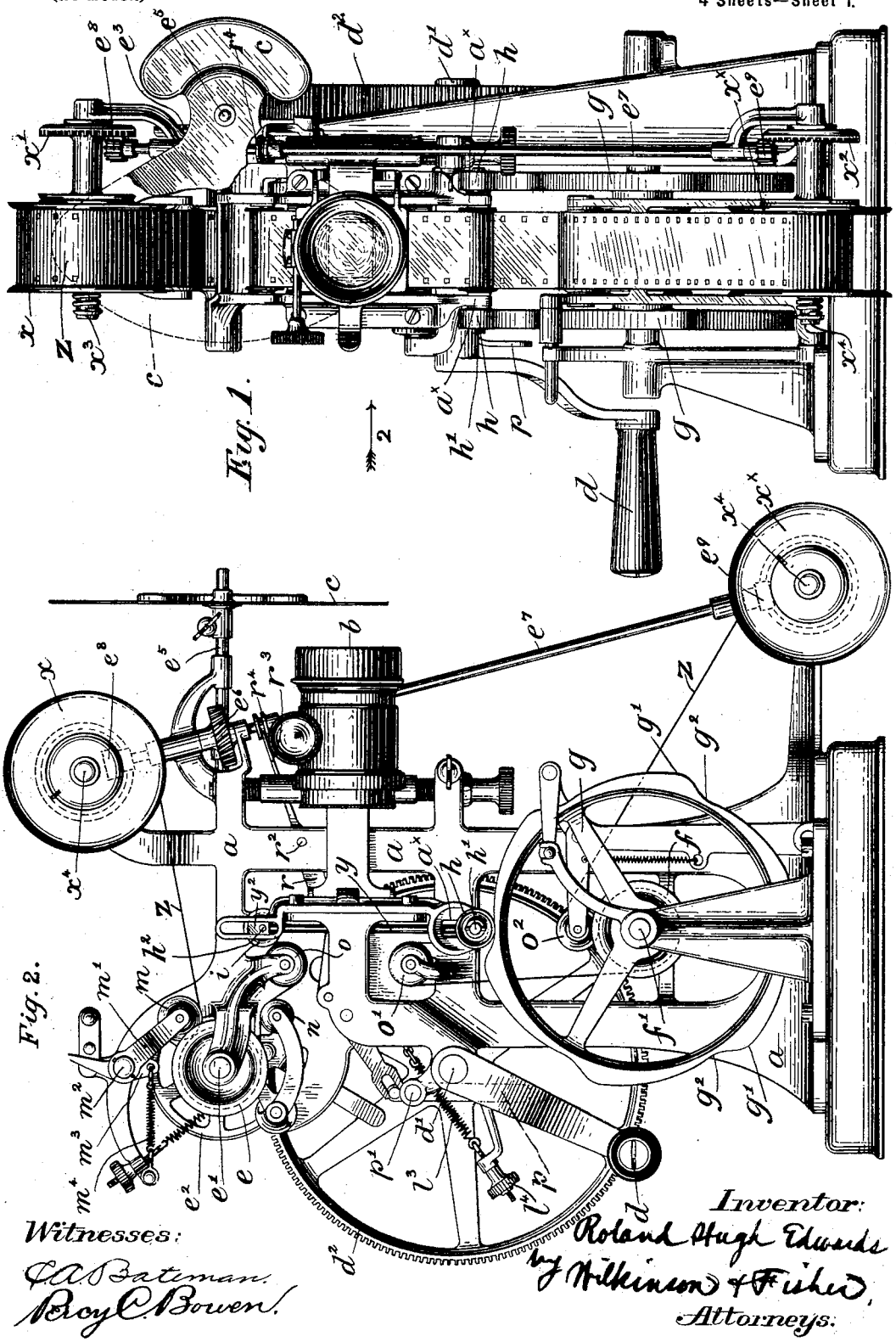

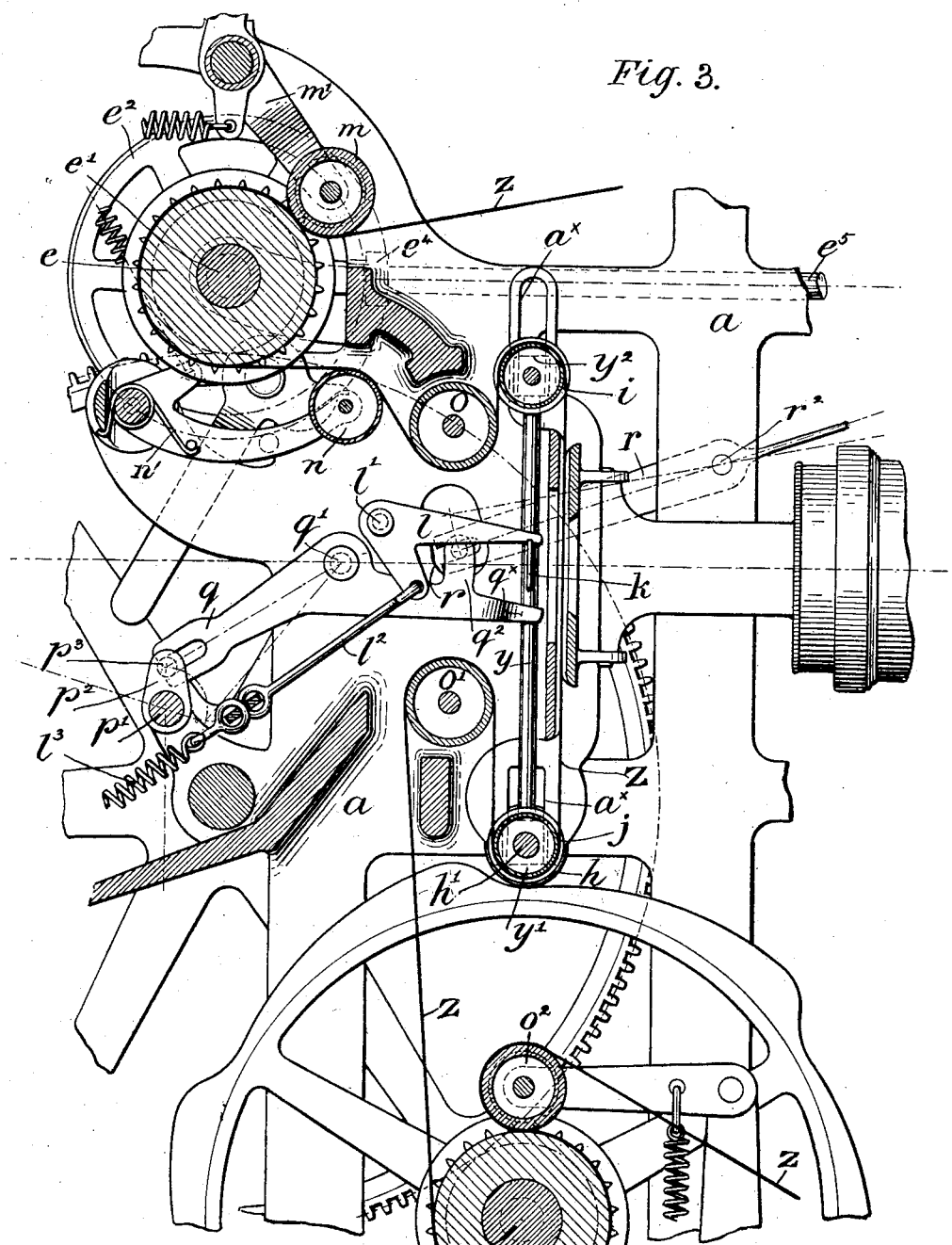

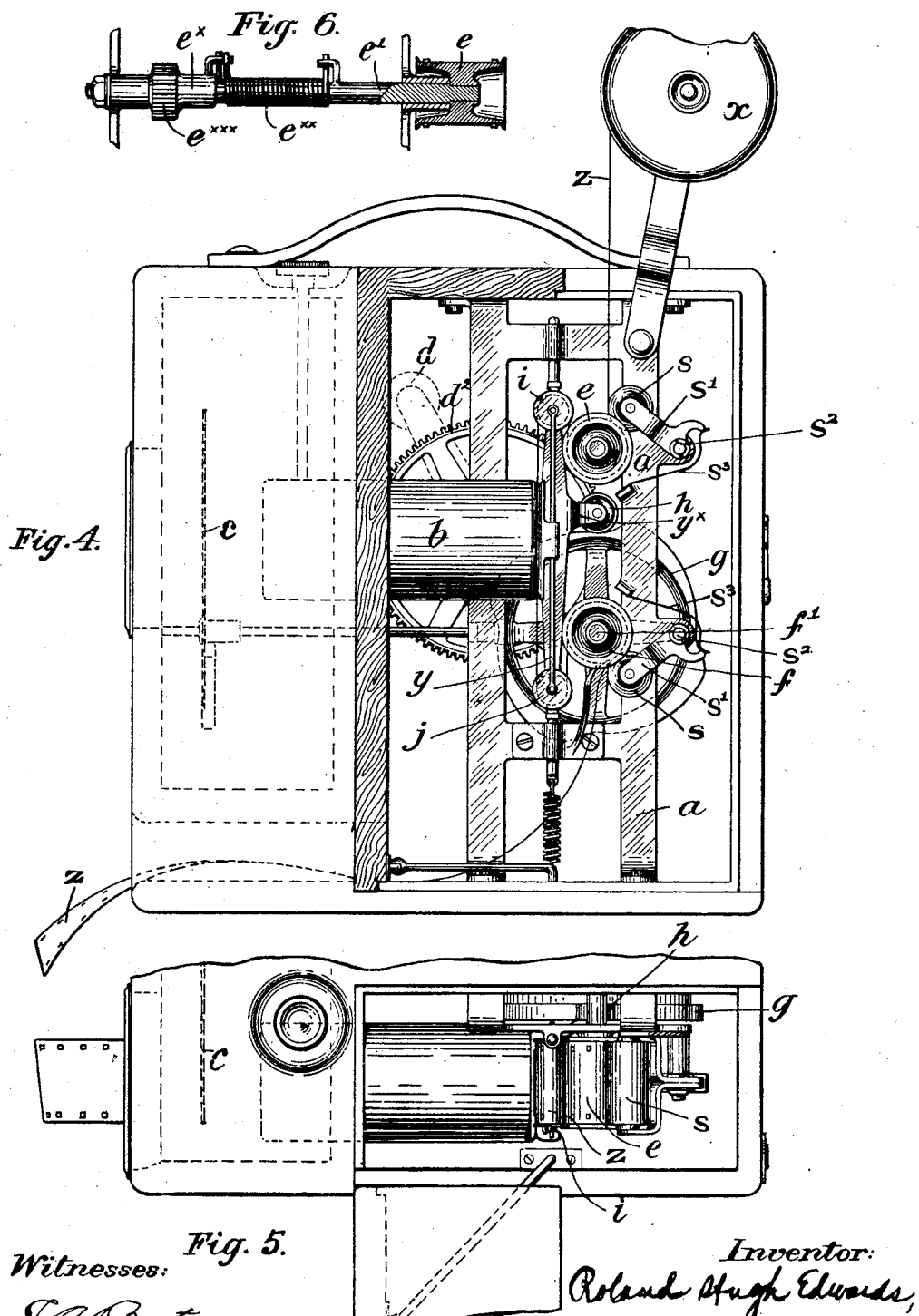

No. 704,449. Patented July 8, 1902.
R. H. EDWARDS.
PROJECTING APPARATUS.
(Application filed May 16, 1898.)
(No Model.) 4 Sheets—Sheet 4.

UNITED STATES PATENT OFFICE.

ROLAND H. EDWARDS, OF LONDON, ENGLAND.

PROJECTING APPARATUS.

SPECIFICATION forming part of Letters Patent No. 704,449, dated July 8, 1902.

Application filed May 16, 1898. Serial No. 680,851. (No model.)

*To all whom it may concern:*

Be it known that I, ROLAND HUGH EDWARDS, draftsman, a subject of the Queen of Great Britain, residing at 37 Queen's road, Brownswood Park, Highbury, London, England, have invented Improvements in Projecting Apparatus, of which the following is a specification.

This invention has for its object improvements in or relating to operating the films for animated photography and apparatus therefor and is as follows: The film may be of the usual or any suitable character, length, width, &c., and has endwise motion imparted thereto or is caused to travel by any suitable means—such, for instance, as any of the well-known appliances or means at present employed for advancing the film when taking a series of photographs in rapid succession and also any suitable shutter or shutters may be employed and same may be operated by or arranged to act in conjunction with such film-operated mechanism in any well-known or suitable manner.
Between the winding-roller or equivalent and the unwound portion of the film according to my present invention I pass the film around or partially around two fixed stationary guide-rollers (which may, if desired, be the sprocket or film-advancing rolls) arranged on opposite sides of the longitudinal axis of the lens or projected rays, and then I lead said film around two or other suitable number of interposed and movable rollers, drums, or equivalent adapted to be bodily reciprocated, these rollers being so arranged as to cause the film to make a circuitous or divergent course in passing from one said stationary guide-roller to the other. These movable rollers are reciprocated or motion is imparted to same in such wise that same will carry the film or the loop or lap thereof bodily therewith, and therefore when these reciprocating movable rollers (and with same the aforesaid loop or lap of film thereon) are swinging or moving in the opposite direction to the lengthwise motion of the film consequently at such period or moment that part of the film stretched between the two (or other number of) movable rollers is stationary with regard to the longitudinal axis of the lens or projected rays or light, while when said movable rollers move or are moved in the opposite direction thereby the speed of advance or travel of the film is at such moment very greatly accelerated and at such moment the shutter acts—*i. e.*, is closed.

Reciprocatory movement may be imparted to the movable rollers in any suitable manner and by any suitable means—such, for instance, as mounting two such movable rollers in a reciprocating, rocking, or sliding frame, the line of motion of which latter is transverse to the longitudinal axis of the lens or of the projected rays and then I may impart reciprocatory movement to said frame by means of a cam or multi-cam fixed on or operated by or from the film-winding drum, such multi-cam having a number of prolonged curves (to move the frame and consequently that part of the film between said movable rollers at a speed exactly equal to the travel of the whole film itself) and then short or sharp curves which return the sliding-frame (and with same its movable rollers) very rapidly—or I may arrange two movable rollers to reciprocate in opposite directions to one another, and the film is led around four guide-rolls arranged in pairs, one movable roller operating between the two rolls of one pair, so as to depress the film more or less, and the other movable roller being arranged to depress the film between the other said pair.

By the use of my present invention the advance of the film over the stationary rollers— that is, the motion imparted to the film lengthwise—is continuous instead of intermittent, which is a great desideratum.

Figure 8:
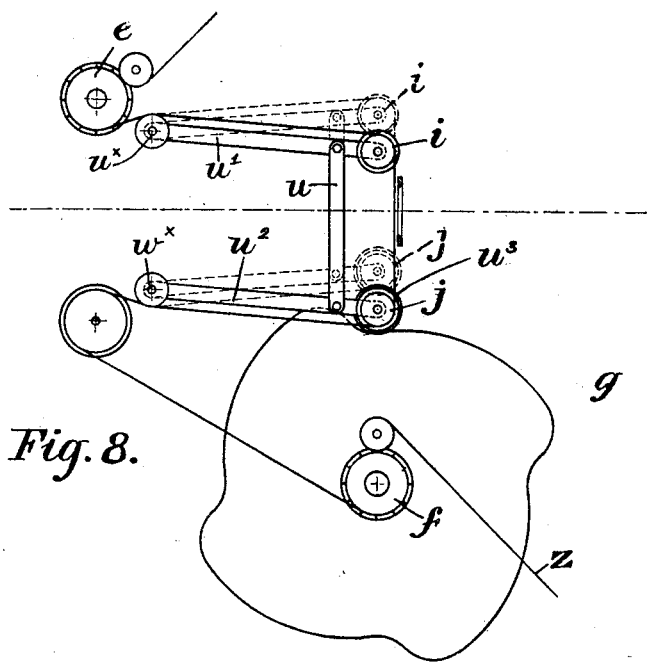

Referring to the accompanying drawings Figure 1 is a front elevation of an apparatus according to my present invention, showing the operating mechanism without the light-tight case. Fig. 2 is a side elevation of Fig. 1 looking in the direction of the arrow 2, Fig. 1. Fig. 3 is an enlarged view, partly in section and partly in side elevation, of the mechanism shown in Figs. 1 and 2. Fig. 4 is a side view, partly in section, of a modified construction of the apparatus shown in a case. Fig. 5 is a plan of Fig. 4 with the top of the casing removed, thus showing part of the interior mechanism. Fig. 6 is a detail view of shaft with flexible joint therein for one of the advancing-rolls. Figs. 7 and 8 are diagrammatic views of modifications.

$a$ is the main frame or stand-supporting mechanism.

$b$ is the lens.

$c$ is revolving shutter of the usual type, this latter being operated as hereinafter described.

$d$ is the driving-crank, fixed on the shaft $d'$, on which latter is fixed the main driving toothed wheel $d^2$, which latter gears with toothed wheels (not shown) respectively fixed on the shafts $e'$ and $f'$, these shafts $e'$ and $f'$, respectively, having fixed thereon the film-advancing rollers $e$ and $f$. On the shaft $e'$ is also fixed the crown-wheel $e^2$, having a ring of teeth $e^3$ (see Fig. 1) on the side face thereof opposite to that shown in Figs. 2 and 3, this ring of teeth $e^3$ gearing with the pinion $e^4$ (shown on dotted lines in Fig. 3) on the shaft $e^5$, on which latter is fixed the shutter $c$, by which means the latter is revolved synchronously with the revolution of the film-advancing rolls $e$ and $f$. On this shaft $e^5$ also there is a worm (not shown) just behind the worm-wheel $e^6$, (see Fig. 2,) which latter is splined on the shaft $a^7$, whereby said shaft $e^7$ is revolved, while at same time this shaft $e^7$ can be moved in the direction of its length, as hereinafter described, this shaft $e^7$ having at opposite ends thereof toothed wheels $e^8$ and $e^9$ which gear with the crown-wheels $x'$ and $x^2$, respectively fixed on the shafts $x^3$ and $x^4$, on which latter the aforesaid drums $x$ and $x^{\times}$ are rigidly mounted, the arrangement being such that when the gear-wheel $e^8$ is in engagement with the ring $x'$ at such moment the gear-wheel $x^2$ is out of engagement with the ring of teeth $x^2$, and vice versa, so that when one drum $x$ or $x^{\times}$ is forcibly revolved the other of these two drums runs free, except so far that I find it advantageous to put a brake or drag on said free drum to prevent the latter revolving too loosely.

On the shaft $f'$ is rigidly fixed a cam-wheel $g$, this latter being provided with a series of cam-like or raised surfaces $g'$ and a series of depressions $g^2$, arranged equidistant around the periphery of the wheel $g$, two such wheels $g$ (see Fig. 1) being fixed on the axle $f'$— i. e., the opposite edges of the film $z$—and against these cam-like wheels $g$ rest rollers $h$, which latter are mounted loosely and independently on an axle or pin $h'$, fixed to the lower end of the reciprocating frame $y$, (which latter I shall hereinafter refer to as the "vibratory frame,") this vibratory frame at its lower and upper end having slice-blocks $y'$ and $y^2$, (shown in dotted lines in Fig. 3,) adapted to slide in the guideways $a^{\times}$, carried on the frame $a$, the upper pair of blocks $y^2$ being connected by a pin $h^2$, on which latter is mounted an idle roller $i$, while the lower pin $h'$ in said vibratory frame $y$ carries thereon an idle roller $j$, (see Fig. 3,) around which idle rollers $i$ and $j$ the film $z$ is led, as hereinafter described. This vibratory frame also carries thereon a projection $k$ on each side thereof (see Fig. 3) with which is adapted to engage a finger or arm $l$ on a bell-crank device pivoted at $l'$ to the frame $a$, the other arm of each said bell-crank device being normally drawn down by the spring $l^3$, connected through a yoke and connecting-rod $l^2$ to said bell-crank $l$, the said spring $l^3$ being adjustable by means of a tension-nut $l^4$. (See Fig. 2.) The function of this finger $l$ on each side of the vibratory frame $y$ is to normally force the idle-rollers $h$ on said vibratory frame against the cam-like wheels $g$ and keep said rollers $h$ firmly pressed against the varying surfaces of said cam-wheel $g$.

The length of film $z$ coming from the spool or drum $x$ is led under the tension-roller $m$, which latter is journaled in the arms $m'$, pivoted at $m^2$ to the frame $a$ and having thereon a lever-arm $m^3$, controlled by the spring $m^4$, the latter fixed to the frame $a$, (see Fig. 2,) around or partly around the circumference of the sprocket-advancing roller $e$ and thence over the tension-roller $n$ under the fixed guide-roller $o$, thence around the idle roller $i$ down to the idle roller $j$ in the vibratory frame $y$, and then over the fixed guide-rollers $o'$ and thence around the second advancing sprocket-roller $f$ and over the tension-roller $e^2$, (corresponding to the tension-roller $m$,) the film $z$ passing to the winding-roll or spool $x^{\times}$, upon which same is wound by the rotary motion imparted to the latter by means of the shaft $e^7$, as hereinbefore described. As the main shaft $d'$ is revolving, and thereby imparts equal rotary motion, as aforesaid, to the advancing sprocket-wheels $e$ and $f$, respectively, the cam-wheels $g$ are simultaneously revolved at a high speed, and thereby the vibratory frame $y$ is rapidly reciprocated synchronously with the revolutions imparted to the shutter $c$, and the parts and speed thereof of the mechanism are so arranged relatively that the speed of travel of the reciprocal motion imparted to the vibratory frame $y$ is such as to bring that part of the film between the rollers $i$ and $j$ to rest—that is to say, stationary with respect to the lens-axis—during the upstroke of the vibratory frame $y$, while when said rollers $i$ and $j$ are moved in the opposite direction— i. e., on the downstroke of the frame $y$— thereby the speed of advance or travel of that part of the film $z$ around the rollers $i$ and $j$ is at such moment therefore greatly accelerated, and at this moment the shutter $c$ acts—that is, is closed during the downstroke. When the film $z$ has all been wound on the spool or winding-roll $x^{\times}$, if it is desired to wind same back onto the reel $x$—for instance, if it is desired to immediately again exhibit the length of film just wound onto the reel $x^{\times}$—in such case I provide means to wind said film back—viz., by means of reversing mechanism. (Shown in Figs. 1, 2, and 3.)

$p$ is a short hand-lever fixed rigidly onto the shaft $p'$, on which latter, toward each end thereof, are fixed short lever arms or cranks $p^2$, having crank-pins $p^3$ fixed thereon, which latter engage in the forked end of a lever $q$, pivoted at $q'$, (see Fig. 3,) the other end $q^\times$ of each said pivoted lever $q$ extending under the aforesaid projections $k$ on the vibratory frame $y$, whereby when the forked ends of the lever $q$ are depressed the other end $q^\times$ of each said lever is raised and lifts the vibratory frame, and thereby lifts and supports idle rollers $h$ clear of the cam-wheels $g$. One of the said levers $q$ has an arm or extension $q^2$ thereon, (see Fig. 3,) to which is pivotally attached the end $r'$ of an arm or lever $r$, pivoted at $r^2$ (see Fig. 2) to the frame $a$, the other end $r^3$ of said lever being forked and such forked end engaging in the depression or channel of a grooved wheel $r^4$, which latter is rigidly fixed on the aforesaid revolving shaft $e^7$, which is adapted to slide on a feather through the worm-wheel $e^6$, as aforesaid, whereby it follows that when the lever $p$ is operated the vibratory frame $y$ can be lifted clear of the cam-wheel $g$, and simultaneously the gear-wheel $e^9$ is moved out of gear with the winding-drum $x^\times$ and sets the latter free, while at same time the gear-wheel $e^8$ on the shaft $e^7$ is moved into gear with the drum $x$, whereby the latter is revolved and becomes the winding-drum upon which the film $z$ is wound back off the drum $x^\times$.

Referring now to Figs. 4 and 5, similar letters of reference indicate corresponding parts in these modifications, as in Figs. 1 to 3. In this arrangement the film $z$ is led around idle rollers $i$ and $j$, carried in the vibratory frame $y$, as before, only in this arrangement the vibratory frame $y$ has a single idle roller $h$, carried in arms $y^\times$ about midway of said frame, and a single cam-wheel $g$ (mounted on the shaft $f'$, as before) acts upon said roller $h$ to reciprocate said vibratory frame, as before, $s\,s$ being tension-rollers carried in the arms $s'\,s'$, respectively pivoted to the frame $a$ at $s^2\,s^2$, which tension-rollers the springs $s^3\,s^3$, respectively, keep pressed against the sprocket advancing-rolls $e$ and $f$, respectively, (grooves being provided in said tension-rolls $s\,s$ opposite the sprocket-teeth on said advancing-rolls $e$ and $f$, respectively,) while said springs $s^3\,s^3$ permit said tension-rolls to be swung outward away from the advancing-rolls $e$ and $f$ and hold same in such withdrawn position to thus enable the fresh film to be mounted in position around said rolls $e\,f\,i\,j$, &c., and thereupon the tension-rolls $s\,s$ can be swung back into position again.

In Fig. 6 $e'$ is the shaft, carrying on the end thereof the aforesaid film-advancing sprocket-wheel $e$, this shaft $e'$ being flexibly connected to the part $e^\times$ through the medium of the coiled spring $e^{\times\times}$. This part $e^{\times\times}$ on the shaft $e'$ has fixed thereon the gear-wheel $e^{\times\times\times}$, which latter meshes with the teeth of the large toothed wheel $d^2$, the object of this arrangement being that as the part $e^\times$ is revolved it will thereby put the spring $e^{\times\times}$ under torsion, and thereby revolve the shaft $e'$, by which means any slackness in the film is prevented, and this device, as shown in Fig. 6, may be used in lieu of the tension-roller $n$ to thereby always keep the film $z$ stretched taut between the rollers $i$ and $j$.

Referring now to Figs. 7 and 8, in Fig. 7 rollers $i$ and $j$ are stationary rollers—that is to say, there is no vertically-reciprocated vibratory frame $y$ in this case, but in lieu thereof the movable rollers $t\,t^\times$ are pivoted loosely on the horizontally-movable frame-bars $t'\,t'$, one end of each of which latter is pivoted to the link $t^2\,t^2$, respectively, the latter being pivoted at $t^3\,t^3$ to the fixed part of the frame $a$, while the other ends of said bars $t'\,t'$ are pivoted to the yoke or oscillating lever $t^4$, this latter being pivoted so as to oscillate on the fixed point $t^5$. On the axis of the lower roller $t^\times$ or pivoted to the lower frame $t'$ I arrange an idle roller $h^\times$, adapted to ride against the cam-wheel $g$, which latter is revolved, as before, by which means the movable roller $t^\times$ is moved, say, to the left, while the movable roller $t$ is moved to the right, and vice versa, by which means the film $z$ is brought to a standstill, as when the lower roller $t^\times$ is moved to the left the other roller $t$ is moved to the right, and thereby the film coming off the top reel around the advancing-roller $e$ is absorbed in the extra distance between the roller $t$ and the roller $i$ and guide-roller $t^6$, while at the same moment the altered position of the lower roller $t^\times$—viz., as it approaches nearly to the roller $j$ and guide-roller $t^7$, (as indicated in dotted lines)—thereby allows the winding of the film $z$ around the advancing-roll $f$ without any advancing movement of the film taking place between the rollers $i$ and $j$—that is, the film at this point becomes stationary and at such moment is exposed, while on the reverse motion taking place the film is advanced at an accelerated speed between the rollers $i$ and $j$, at which moment the shutter is closed. In the arrangement shown in Fig. 8 the vibratory frame carrying the rolls $i$ and $j$ consists of two horizontally-extending arms $u'$ and $u^2$, respectively pivoted at $u^\times$ to the frame $a$ and pivotally joined at or toward the other end thereof by the yoke $u$, the lower arm $u^2$ carrying an idle roller $u^3$ thereon, which latter rides against the cam-wheel $g$, as before, and thereby the pivoted frame $u\,u'\,u^2$ is vertically reciprocated with the rollers $i\,i'$ therein, and the film is thus alternately brought to rest and the speed of travel accelerated—that is to say, that part of said film which lies between rollers $i$ and $j$.

Having thus described my invention, what I claim as new, and desire to secure by Letters Patent of the United States, is—

1. In animated-photograph apparatus, the combination with the film-advancing rollers, and fixed guide-rollers over which a looped portion of the film passes across the axis of a lens; of a vibrating frame, and an idle roller mounted on each end of said frame, said frame and rollers being situated within the looped portion of the film, means for continuously winding and unwinding the film, means for vibrating said frame alternately in a direction with, and in a direction the reverse of the movement of the film, the movement of the said frame with the film carrying said film at an accelerated speed, and the reverse movement of said frame being at a speed equal to the speed of the advance of the film, a shutter, and means for operating said shutter synchronously with the vibration of said frame; substantially as described.

2. In an animated photographic apparatus, the combination with the film-advancing rollers, and fixed guide-rollers over which a looped portion of the film is guided across the axis of a lens; of a vibrating frame and an idle roller mounted on each end of said frame, said frame and rollers being situated in said looped portion of the film, means for continuously unwinding the film, means for vibrating said frame alternately in a direction with and in a direction the reverse of the movement of the film, the reverse movement of said frame being at a speed equal to the speed of the advance of the film, and the movement with the film being accelerated and carrying the film with it, substantially as described.

3. In an animated-photograph apparatus, the combination with the film-advancing rollers, and film unwinding and winding rolls; a vibratory frame; a roller journaled in each end of said frame; means to reciprocate said frame and said rollers therein in such manner that the part of the film between said rollers is held stationary with respect to the lens-axis during the movement in one direction of said vibratory frame, while the speed of travel of said portion of the film is accelerated on the return movement of the said frame; and a shutter adapted to operate synchronously with such return movement, substantially in the manner and for the purposes herein set forth.

4. In animated-photograph apparatus, the combination with the film-advancing rollers, and the film unwinding and winding rolls, of a pair of movable rollers adapted to be reciprocated simultaneously, a roller on each end of one of said rollers, cam-wheels operating in conjunction with said rollers to reciprocate the movable rollers; two pairs of stationary rollers arranged and acting in conjunction with said movable rollers whereby that part of the film between said pair of movable rollers is held stretched across the axis of a lens and intermittently held stationary with respect thereto, and intermittently caused to advance at an accelerated speed; and a shutter adapted to act simultaneously with such accelerated movement, substantially as and for the purposes herein set forth.

5. In animated-photograph apparatus, the combination with film-advancing rollers; of a vibrating frame; a pair of idle rollers mounted in said frame, and fixed guide-rollers, over which a looped portion of the film is guided across the axis of a lens; means for continuously unwinding and winding the film, a cam-wheel operating in conjunction with one of the film-advancing rollers engaging a portion of said vibrating frame and operating the same alternately in a direction with, and in a direction the reverse of the movement of the film, the reverse movement of said frame being at a speed equal to the speed of the advance of the film, and the return movement being accelerated; a shutter, and means for operating said shutter synchronously with the operation of said frame, substantially as described.

6. In animated photographic apparatus, the combination with the film-advancing rollers; of a vibrating frame; an idle roller mounted on each end of said frame; over which a looped portion of the film is guided across the axis of a lens; means for continuously unwinding the film; a roller on each end of one of said idle rollers, cam-wheels operating in conjunction with said rollers for vibrating said frame alternately in a direction with and in a direction the reverse of the movement of the film; such reverse movement being at a speed equal to the speed of the advance of the film, and the return movement being accelerated, substantially as described.

7. In animated photographic apparatus, the combination with the film-advancing rollers; of a vibrating frame; an idle roller mounted on each end of said frame over which a looped portion of the film is guided across the axis of a lens; means for vibrating said frame alternately in a direction with and in a direction the reverse of the movement of said film, the reverse movement of said frame being at a speed equal to the speed of the advance of the film, and the return movement being accelerated, substantially as described.

8. In an animated-photograph apparatus, the combination, with film-reels, and film-feeding mechanism, of a film-support, carrying the portion of the film which is in the field of the apparatus, which support is independent of the reels, is movable in the direction of motion of the film through said field, and imparts motion to the film passing over it independent of the motion imparted thereto by the feeding mechanism, and means for vibrating the support laterally in the direction of motion of the film and in the opposite direction, substantially as described.

9. In a consecutive-view apparatus, the combination with reels or equivalent means for supplying and taking up a flexible film or picture-strip and mechanism for feeding the film through the field of the apparatus, of a movable film-support, independent of said reels or equivalent means, and over which the film passes when passing through the field of the apparatus, said support being mounted to move in a direction opposite to that of the film passing over it, and means for so moving said support at a speed substantially equal to that of the film passing over it, whereby the portion of the film passing over said support may be held stationary, at intervals, in the field of the apparatus, substantially as described.

10. In a consecutive-view apparatus, the combination with reels or equivalent means for supplying and taking up a flexible film or picture-strip, and mechanism for feeding the film through the field of the apparatus, of a movable film-support independent of said reel or equivalent means and of said feeding mechanism, and over which the film passes when passing through the field of the apparatus, said support being mounted to move at intervals in a direction opposite to that of the film passing over it, and means for so moving said support at a speed substantially equal to that of the film passing over it, whereby the portion of the film passing over said support may be held stationary at intervals in the field of the apparatus, substantially as described.

11. In a consecutive-view apparatus, the combination with reels or equivalent means for supplying and taking up a flexible film or picture-strip, and mechanism for feeding the film through the field of the apparatus, of a movable film-support, independent of said reels or equivalent means and over which the film passes when passing through the field of the apparatus, said support being mounted to move at intervals in a direction opposite to that of the film passing over it, and having stationary axes near which the film passes when passing to and from said support, and means for moving said support in a direction opposite, but at a speed substantially equal to that of the film passing over it, whereby the portion of the film passing over said support may be held stationary, at intervals, in the field of the apparatus, substantially as described.

12. In a consecutive-view apparatus, the combination with reels or equivalent means for supplying and taking up a flexible film or picture-strip, and mechanism for feeding the film through the field of the apparatus, of a vibrating film-support independent of said reels or equivalent means, and over which the film passes when passing through the field of the apparatus, said film-support being arranged to move alternately in the direction of motion of the film passing over it and in the direction opposite thereto, and a cam for vibrating said support, arranged to move in the direction opposite to that of the film with a velocity substantially equal to that of the film, whereby the portion of the film passing over said support may be held stationary, at intervals, in the field of the apparatus, substantially as described.

13. In a consecutive-view apparatus, the combination with reels or equivalent means for supplying and taking up a flexible film or picture-strip, and mechanism for feeding the film through the field of the apparatus, of a vibrating film-support, independent of said reels or equivalent means, and over which the film passes when passing through the field of the apparatus, said film-support being arranged to move alternately in the direction of motion of the film passing over it and in the direction opposite thereto, and a cam for vibrating said support arranged to move it in the direction opposite to that of the film with a velocity substantially equal to that of the film, and so proportioned that the period during which the support is moved in opposition to the motion of the film, is longer than the period during which said support is moved with the film, whereby the portion of the film passing over said support may be held stationary, at intervals, in the field of the apparatus, and for longer periods than the periods of motion of the film through the field of the apparatus, substantially as described.

14. In a consecutive-view apparatus, the combination with reels or equivalent means for supplying and taking up a flexible film or picture-strip, a main driving-shaft, and film-feeding rolls driven thereby, of a movable film-support having film-guides located upon opposite sides of the field of the apparatus, and over which the film may pass, said support imparting motion to the portion of the film passing over it independent of the motion imparted thereto by the feeding-rolls, and a cam on said driving-shaft arranged to move said film-support alternately in the direction of motion of the film and in the direction opposite thereto, substantially as described.

R. H. EDWARDS.

Witnesses:
H. D. JAMESON,
F. L. RANDS.